W. A. HOMAN.
ADDING MACHINE.
APPLICATION FILED APR. 16, 1917.

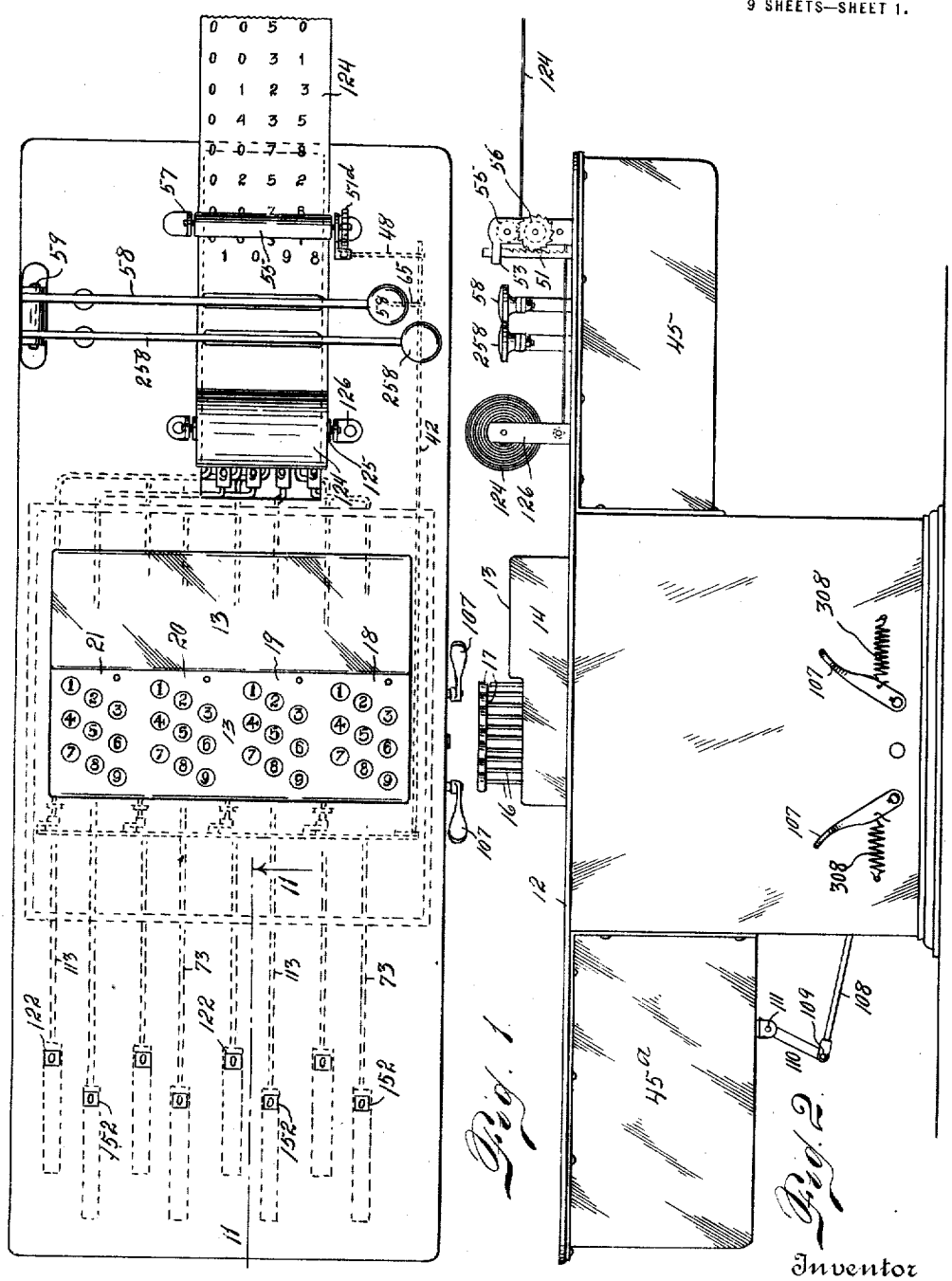

1,333,253. Patented Mar. 9, 1920.
9 SHEETS—SHEET 2.

Inventor
Walter A. Homan.
Attorney

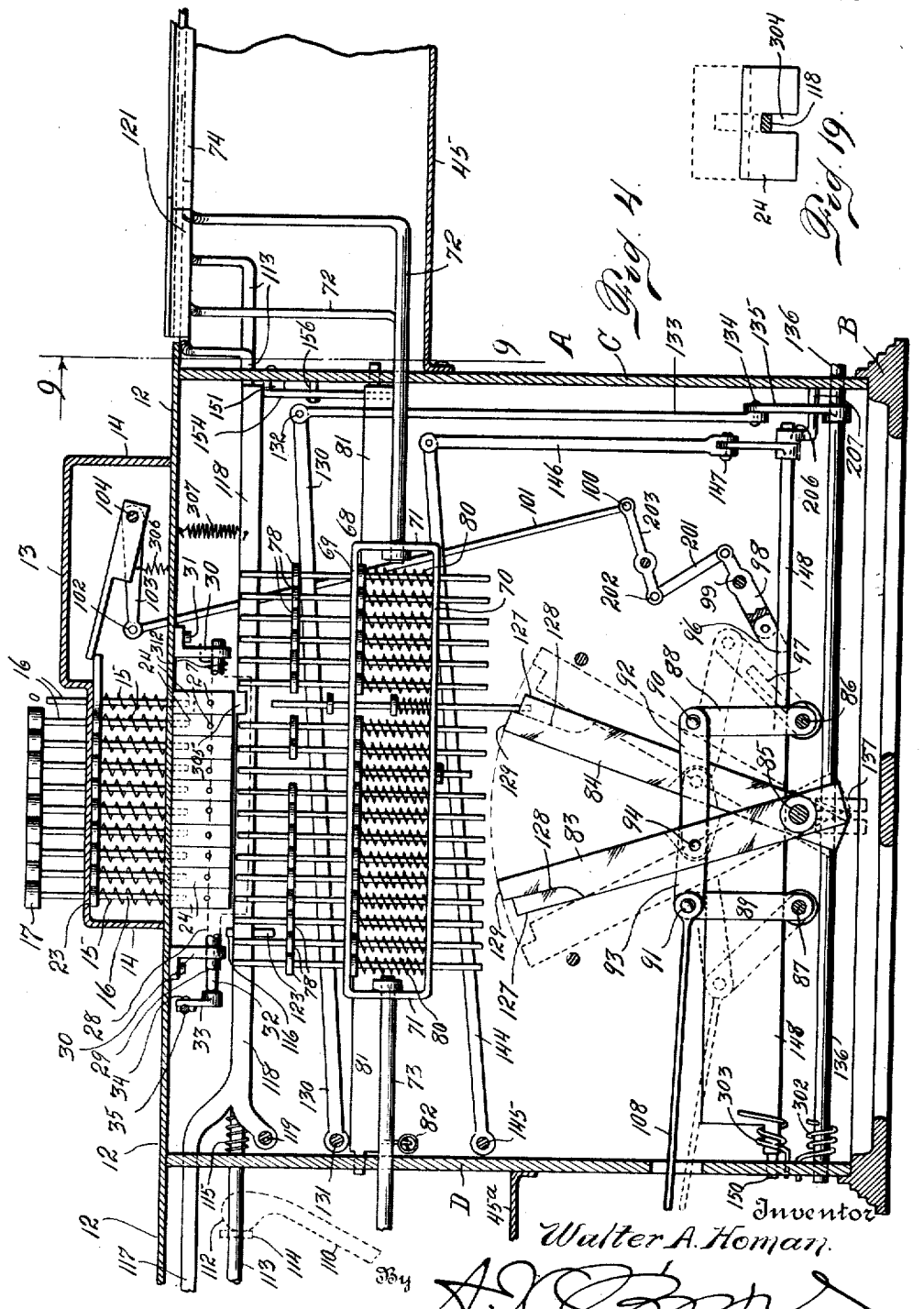

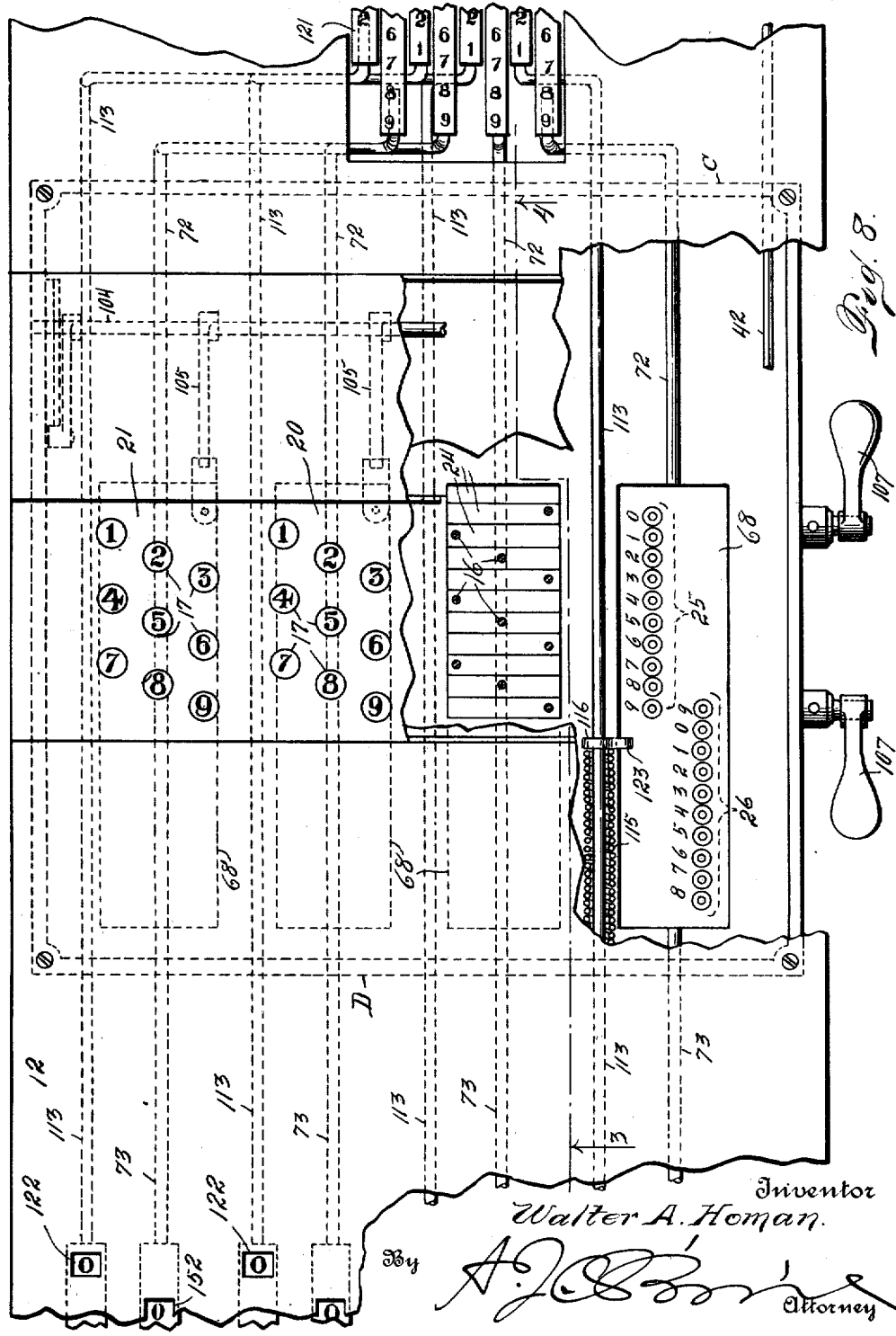

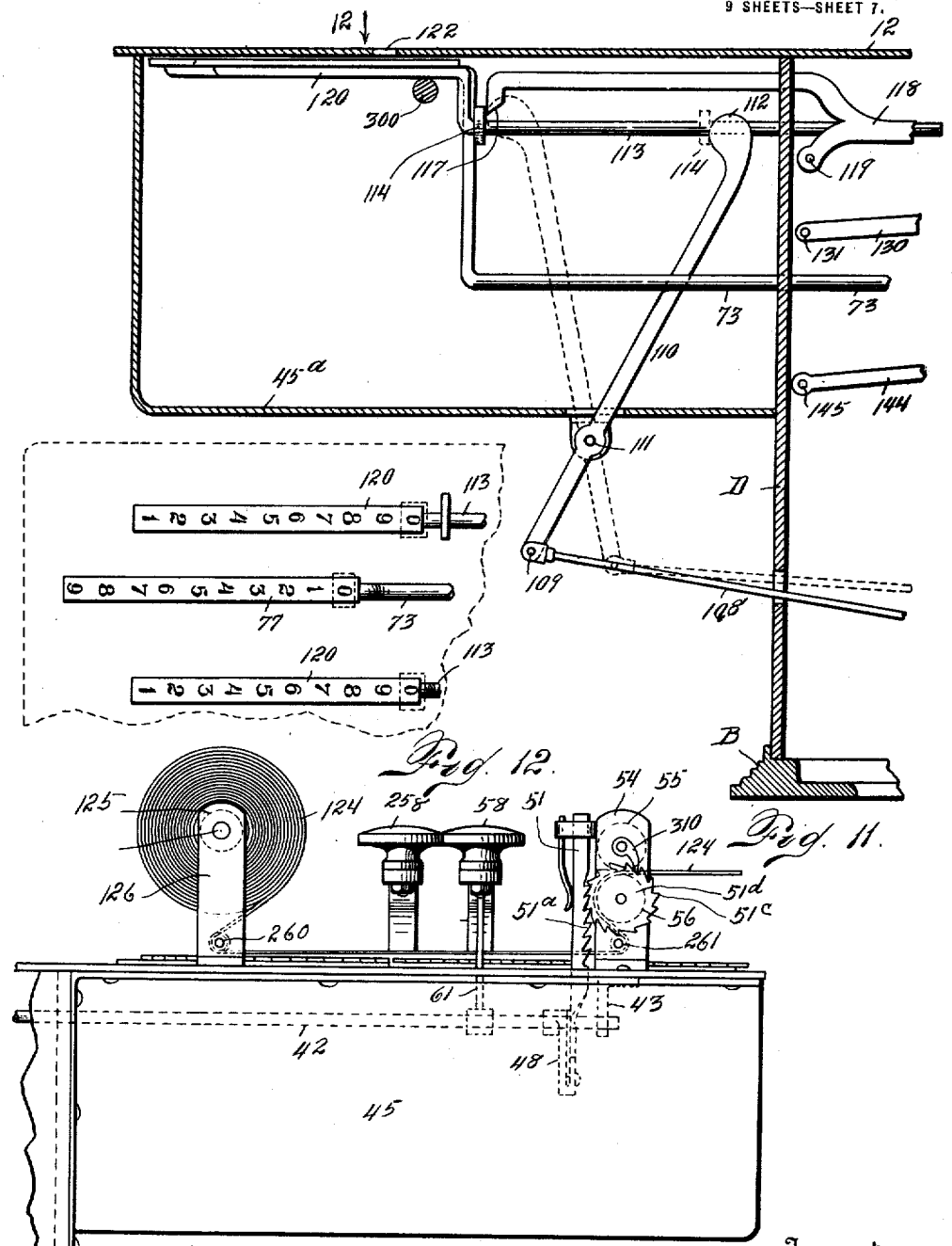

Inventor
Walter A. Homan.
By
Attorney

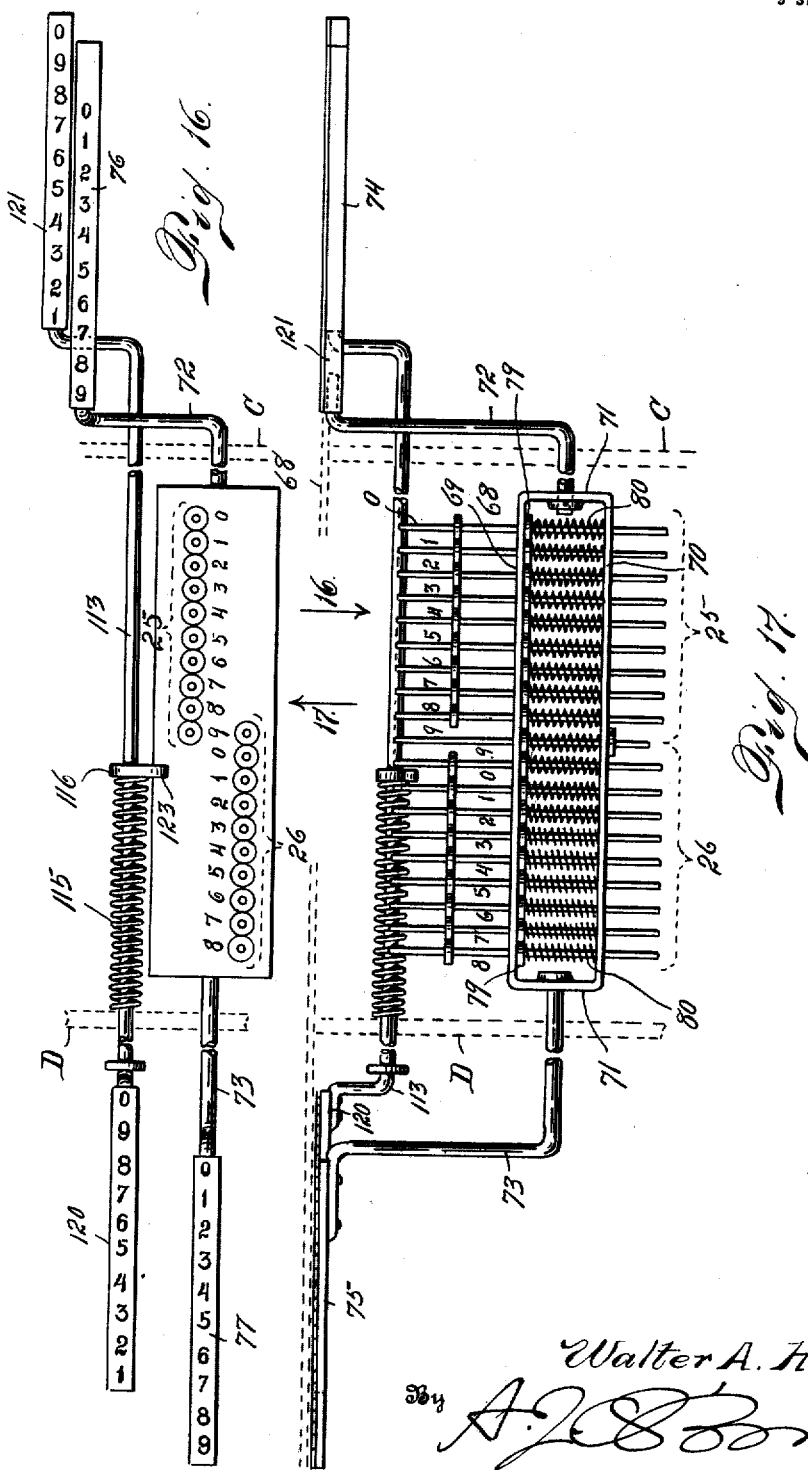

UNITED STATES PATENT OFFICE.

WALTER A. HOMAN, OF DENVER, COLORADO.

ADDING-MACHINE.

1,333,253.  Specification of Letters Patent.  Patented Mar. 9, 1920.

Application filed April 16, 1917. Serial No. 162,292.

*To all whom it may concern:*

Be it known that I, WALTER A. HOMAN, formerly a subject of the Empire of Germany, but having declared my intention to become a citizen of the United States, residing at the city and county of Denver and State of Colorado, have invented certain new and useful Improvements in Adding-Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in adding machines, my object being to provide an exceedingly simple and economical construction of this character which shall at the same time be easily operable and thoroughly efficient for the purpose intended.

The structure consists of a number of features which I prefer to refer to as the adding, moving, carrying, auxiliary-carrying, operating and printing devices respectively. What I term the adding structure or mechanism consists of a keyboard having banks of keys respectively designated units, tens, hundreds, thousands, etc.; primary index rods having characters from 1 to 9 inclusive and also the zero character at each end thereof; carriages each consisting of a pair of spaced plates each carrying twenty vertically movable pins which are acted on by stems connected with the keys of the keyboard as the keys are actuated for adding purposes, each carriage being equipped with rods extending from opposite extremities thereof and having formed on the portions adjacent their free extremities, characters from zero to 9 inclusive reversely arranged as to the characters on the corresponding extremities of the index rods. The moving device consists of two arms which are arranged to move simultaneously in reverse directions and in the same vertical planes as the pins of the corresponding carriages, there being a pair of these arms for each carriage, and a carriage for each bank of keys, referring to the banks as units, tens, hundreds, thousands, etc. These arms are employed in shifting the carriages in order to indicate the results of the adding operation. The carrying mechanism consists of means employed in connection with the aforesaid moving arms, for performing the adding function when the result is greater than 9. The auxiliary-carrying mechanism is employed in connection with the carriages when the carriage pins have been adjusted to bring the numerals 9 into the result, in hundreds, thousands, and other higher denominations. The operating mechanism consists of means connected with the arms of the moving mechanism for actuating the latter for the purpose of adjusting the carriages as heretofore explained; while the printing mechanism consists of means for printing the primary numbers after they are put into the machines for adding purposes; and also for printing the result numbers after the carriages have been properly actuated to bring these numbers into proper alinement for printing purposes. This printing mechanism consists of two levers arranged in parallel relation, one connected with the means for printing the primary numbers, and the other connected with the means for printing the result numbers.

Having briefly outlined my improved construction as well as the function it is intended to perform, I will proceed to describe the same in detail, reference being made to the accompanying drawing in which is illustrated an embodiment thereof. In this drawing:—

Figure 1 is a top plan view of the machine shown on a relatively small scale.

Fig. 2 is a side elevation of the same.

Fig. 4 is a section taken on the same line, but showing the carriages or at least one of them shifted toward the right, one of the pins having been depressed and brought into the path of one of the moving arms which are shown actuated sufficiently to bring one of the arms into engagement with the depressed pin.

Fig. 5 is a vertical cross section of the machine taken approximately on the line 5—5 Fig. 3 looking toward the right.

Figs. 6 and 7 are detailed views illustrating the mechanism for locking and releasing the keys and their attached blocks, the keys having been actuated for adding purposes.

Fig. 8 is a fragmentary top plan view of the central portion of the structure showing substantially in plan, the portions of the machine which in Figs. 3 and 4 are shown in sectional elevation.

Fig. 11 is a vertical section taken approximately on the line 11—11 Fig. 1 viewed in the direction of the arrow, the parts being shown on a much larger scale.

Fig. 12 is a top plan view of the left-hand extremities of two of the primary indicating rods and one of the carriage or result ining rods. This view is obtained by looking in the direction of arrow 12, Fig. 11, assuming that the top plate of the machine is removed.

Fig. 13 is a side elevation of what I will term the forward extremity of the machine or that shown at the right in Figs. 1 and 2, this view being shown in a much larger scale than in the last named views.

Fig. 16 is a top plan view of one of the primary indicating rods and one of the carriages with its terminal members, portions of the rods intermediate their extremities being broken away in both instances.

Fig. 17 is a side elevation of the same structure.

Fig. 18 is a detail of construction shown on a larger scale than in Fig. 5.

Fig. 19 is a detail view illustrating the special construction of the blocks of the zero keys.

The same reference characters indicate the same parts in all the views.

Figure 3:
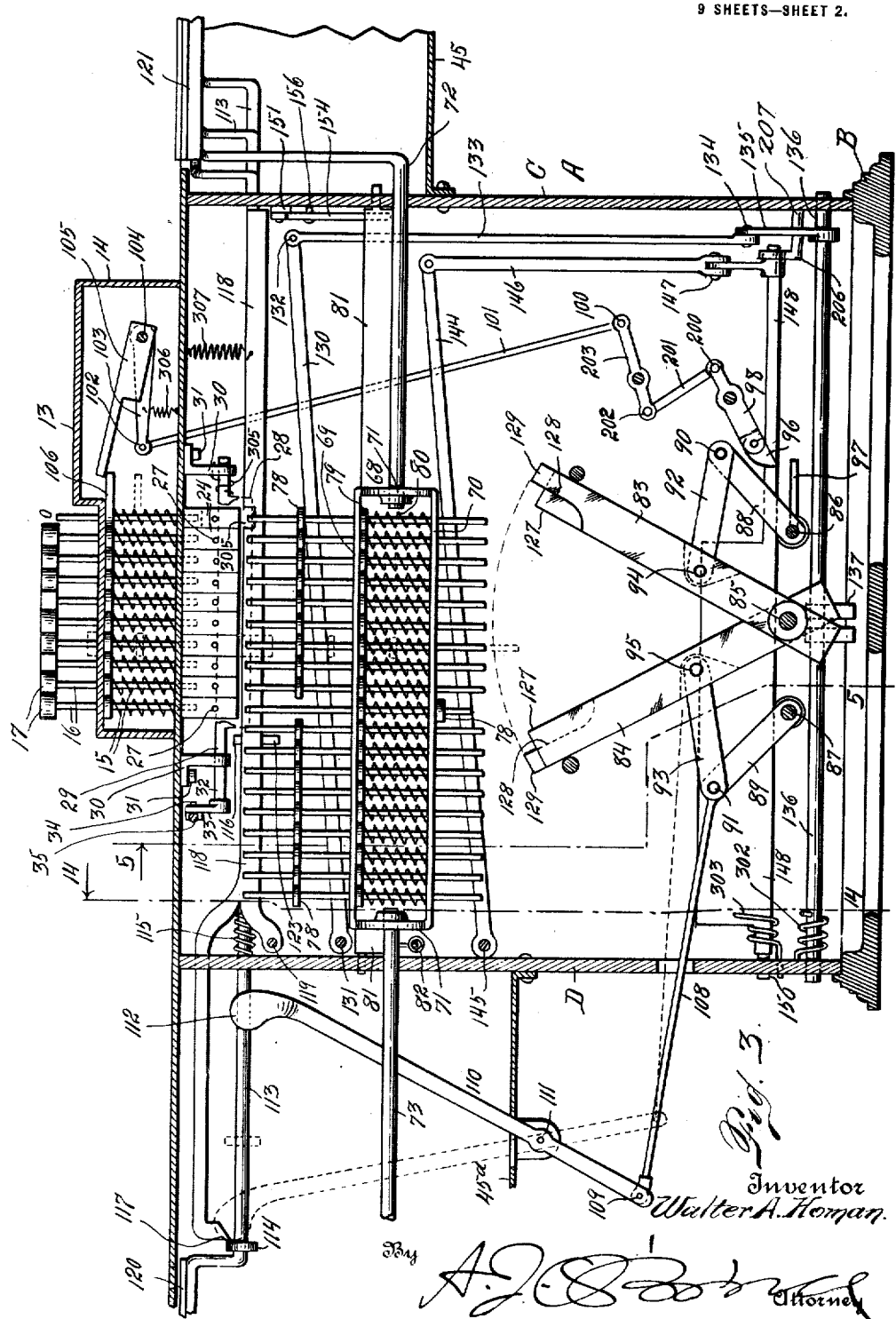
Fig. 3 is a vertical section taken through the central part of the machine both extremities being broken away, the construction being shown on a much larger scale than in Figs. 1 and 2. This section is taken approximately on the line 3—4 Fig. 8 viewed in the direction of the arrows and showing the carriages in their normal positions before adjustment or manipulated for for adding purposes.

Let the letter A designate the main framework of the structure which includes a base B, vertically disposed end plates C and D, side plates E and F, a main top plate 12 and a plate 13 mounted on the top plate and spaced therefrom by a depending part 14 forming a chamber above the top plate 12 in which springs 15 are arranged upon the stems 16 of the keys 17 of the various banks 18, 19, 20 and 21 which are the units, tens, hundreds and thousands banks of keys (see Fig. 1).

The keys of each bank have respectively formed thereon the numerals 1 to 9 inclusive, the zero key which I will designate by the numeral 0 being devoid of a key top because it is actuated by other mechanism of the structure hereinafter explained, a.ter each actuation of the aforesaid moving arms.

Figure 15:
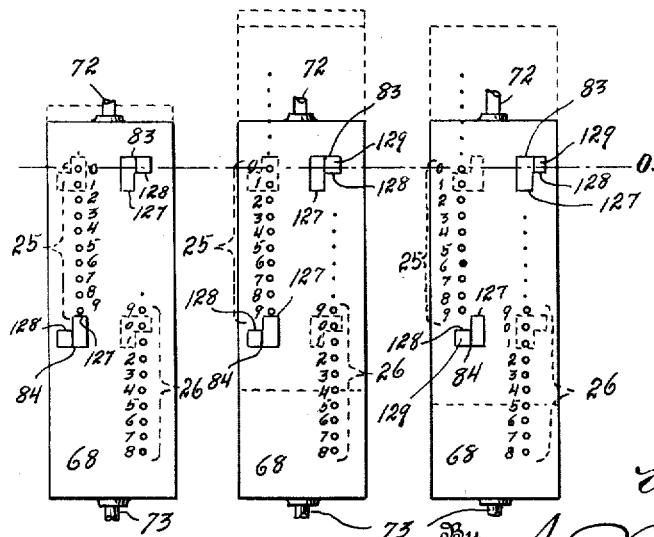
Fig. 15 is a diagrammatic view illustrating the carriages and their manipulating arms being a plan or top view of this structure, the carriages corresponding with the units, tens and hundreds banks of keys only, being illustrated.

The stems 16 of all the keys pass through perforations formed in the plate 13 and are equipped between the plates 12 and 13 with stops 23 which are acted upon by the upper extremities of springs 15 whose lower extremities engage the upper surface of the plate 12. Hence these springs normally maintain the keys at their upward limit of movement as best illustrated in Figs. 3, 4 and 5. The stems 16 of the keys also pass through perforations formed in the top plate 12 and to their lower extremities or the portions below the plate 12, are respectively attached blocks 24 which are of sufficient width to extend across or approximately across the tops of the carriages whereby when the keys are pressed, any block will extend across the top of the carriage in order to engage a pin of either of two rows or sets of pins which rows or sets are respectively designated 25 and 26, there being ten pins of each row or set. Hence the pins of one row, viz., that indicated at the left in Fig. 15 will be designated 25 while the pins of the other row or that at the right in Fig. 15, of each carriage, will be designated by the numeral 26.

Figure 9:
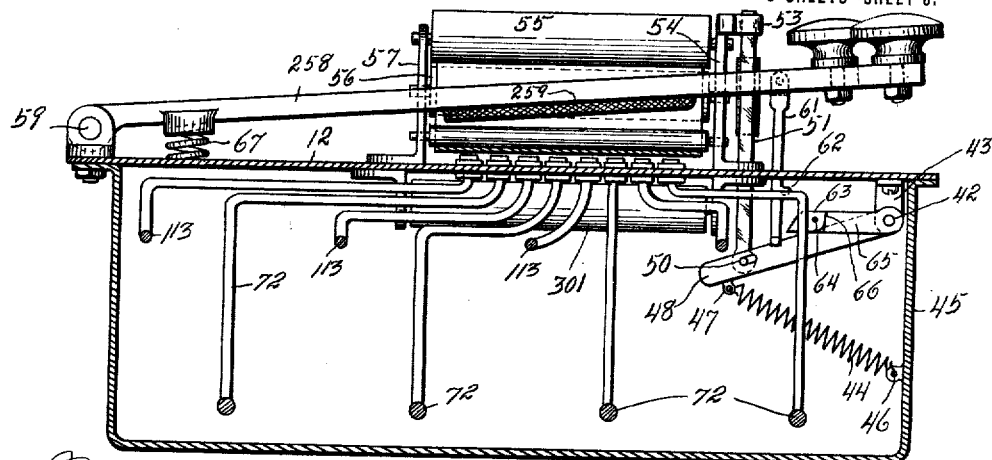
Fig. 9 is a section taken on the line 9—9 Fig. 4 looking toward the right and upon the line 9—9 Fig. 10 looking upwardly or in the direction of the arrow, and more particularly illustrating the printing mechanism.
Figure 10:
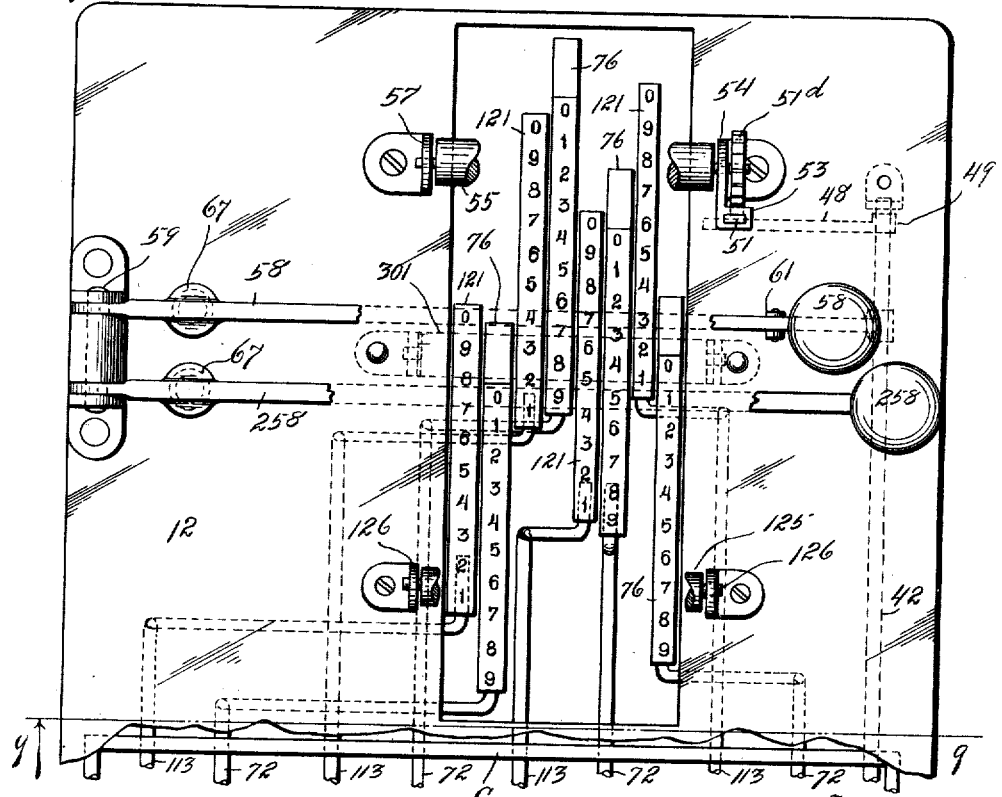
Fig. 10 is a top plan view of the right-hand portion of the machine or the portion illustrated in end view in Fig. 9.

Each of the blocks 24 is provided on one end with a short pin 27, which when the key is depressed whereby the block is carried downwardly a suitable distance, a spring-actuated retaining pawl 28 engages the pin and retains the block and consequently the key in a depressed position, until another key of the same bank is pressed, since a single pawl serves as the retaining and releasing member for all of the keys of each bank 18, 19, 20, 21, etc. The pawl 28 which is of sufficient length for the purpose, is equipped at its opposite extremities with trunnions 29 which are journaled in depending angle brackets 30 which are secured to the under-surface of the top plate 12 as shown at 31. One extremity of one trunnion of each pawl 28 is provided with an extension 32 to which is made fast one extremity of a crank arm 33, the other extremity of the said crank arm being connected as shown at 34 with a common rod 35, the upper extremity of the crank arm in each case carrying a pin 36 which normally engages one extremity 37 of a slot 38 formed in a reinforcement 39 with which the rod is equipped where each crank arm connection is made, thus allowing the pin 36 in each case to move idly in the slot 38 of the part 39 of the rod when the pawl 28 is actuated by the engagement of any pin 27. By virtue of this construction each pawl 28 corresponding with the keys and blocks of each bank, will be actuated for releasing the key at its individual bank only as the keys of that bank are pressed, and will not be actuated for releasing purposes when the keys of any other bank are pressed, and still all of the keys of all the banks may be simultaneously released by the movement of the rod 35 toward the right (see Fig. 5) in which the arrow $a$ indicates the direction of the movement of the rod for releasing all the keys of all the banks. It will be understood that this will operate for this purpose since the pins 36 of all the crank arms 33 engage the left-hand extremities of the stops 38, still referring to Fig. 5 of the drawing. At one extremity the rod 35 is pivotally connected as shown at 40 with a crank arm 41 which is secured at its opposite extremity to a rod 42 which extends forwardly (see dotted lines in Fig. 1). This rod 42 is journaled in suitable supports connected with the top plate of the machine, one of these supports being indicated in Fig. 9 and designated by the numeral 43, the same consisting of an ordinary depending angle bracket. This rod 42 after each partial rotary movement incident to the actuation of the crank arm 41 in the direction of the arrow $a$ in Fig. 5, is returned to its normal position through the medium of a spiral spring 44 (see Fig. 9). One extremity of the spring is connected with the casing 45 as shown at 46 while the opposite extremity is connected as shown at 47 with a relatively long arm 48, one extremity of which is made fast to the rod 42 as shown at 49. The arm 48 is also pivotally connected as shown at 50 with an upright ratchet bar 51 which is vertically movable in a guide 53 mounted on an upright member 54 in which the extremities of rollers 55 and 56 are journaled, the opposite extremities of the said rollers being journaled in a similar upright 57, the two uprights being secured to the top plate 12 as best illustrated in Fig. 9. A lever 58 which is pivotally connected at one extremity as shown at 59, (see Fig. 1) is pivotally connected as shown at 60 with a depending rod 61 whose lower portion is equipped with a projection 62, which when the arm 58 is actuated for printing the primary numbers as hereinafter explained, acts upon a dog 63 pivotally connected as shown at 64 upon the inner extremity of a crank arm 65 which is made fast on the rod 42. This dog is connected with the arm 65 by a sort of knife-blade joint, the arm 65 having a shoulder 66 which locks the dog against movement when force is applied in an upward direction, but allows the dog to move freely when force is applied in a downward direction. Hence when the lever 58 is pressed downwardly for printing purposes, the projection 62 of the rod 61, will engage the dog 63 which will move sufficiently to allow the projection to pass below the dog, but when the lever is released and is carried upwardly by virtue of a spring 67 arranged beneath the said lever near its pivotal extremity, the projection 62 will act on the dog 63 and therethrough on the crank arm 65, to impart a partial rotary movement to the rod 42 in a direction to actuate the rod 35 in the direction of the arrow $a$ (see Fig. 5), whereby all of the pawls 28 will be actuated to disengage them from the pins 27 of the blocks 30 connected with the stems of the keys as heretofore explained.

Arranged beneath the blocks 30 of each bank of keys, is a carriage 68 composed of upper and lower plates 69 and 70 which are spaced by end members 71 to which are respectively connected rod members 72 and 73 which as shown in the drawing are bent upwardly beyond the carriage ends in order to bring their end portions 74 and 75 into the upper casing parts 45 and 45$^a$ located at the forward and rear extremities of the machine as heretofore explained. The part 74 consists of a bar whose upper surface 76 is flattened and contains the characters 0, 1, 2, 3, 4, 5, 6, 7, 8 and 9; while the part 75 consists of a similar bar having a flattened top surface 77 and also containing the same characters arranged in the same way.

The upper and lower plates 69 and 70 of each carriage is perforated to receive two rows or sets of pins, there being ten pins in each set and the two sets being respectively designated by the numerals 25 and 26 as heretofore explained. For convenience of explanation, the pins of the set 25 of each carriage will be respectively given the characters 0, 1, 2, 3, 4, 5, 6, 7, 8 and 9; and the pins of the set 26 will be respectively designated by the characters 9, 0, 1, 2, 3, 4, 5, 6, 7 and 8, the designations for the pins of the set 25 corresponding exactly with the characters and arrangement on the parts 76 and 77 of the carriage rods 72 and 73 as heretofore explained while the arrangement of the characters for the set 26, is a slight modification of the arrangement of these characters in the set 25, in order to bring the pin designated by the character 9 in each case, into transverse alinement in the two rows or sets, the other pins of the two sets of each carriage extending in opposite directions from the pins 9. Normally or before any carriage has been shifted for adding purposes, the pins of the set 25 are directly below and in position to be engaged by the blocks 24 of the keys of the corresponding bank, the block connected with the zero key being in position to engage the zero pin of the set of keys 26 and so on throughout the entire set of keys and pins, while the set of pins 26 other than that designated 9, are not in position to be engaged by the blocks 27 of the respective keys, until the carriage is shifted from its normal relative position with reference to the location of the corresponding bank of keys.

Each pin of each of the sets 25 and 26 of each carraige, is provided with upper and lower stops respectively designated 78 and 79; each of the stops 78 of all the pins except those designated 9, are arranged above the carriage, while the stop 78 of the pins 9 of both sets 25 and 26 are located below the carriage, these particular pins being slightly shorter than the other pins whereby their lower extremities when the pins are depressed, do not extend quite so far below the carriage as the extremities of the other pins. The stops 79 of all the carriage pins are arranged between the two plates 69 and 70, and these stops 79 are normally held in engagement with the upper plate 69 of the carriage by means of springs 80 which surround the pins between the carriage plates, their upper extremities acting on the stop 79 while their lower extremities engage the bottom plate 70.

Figure 14:
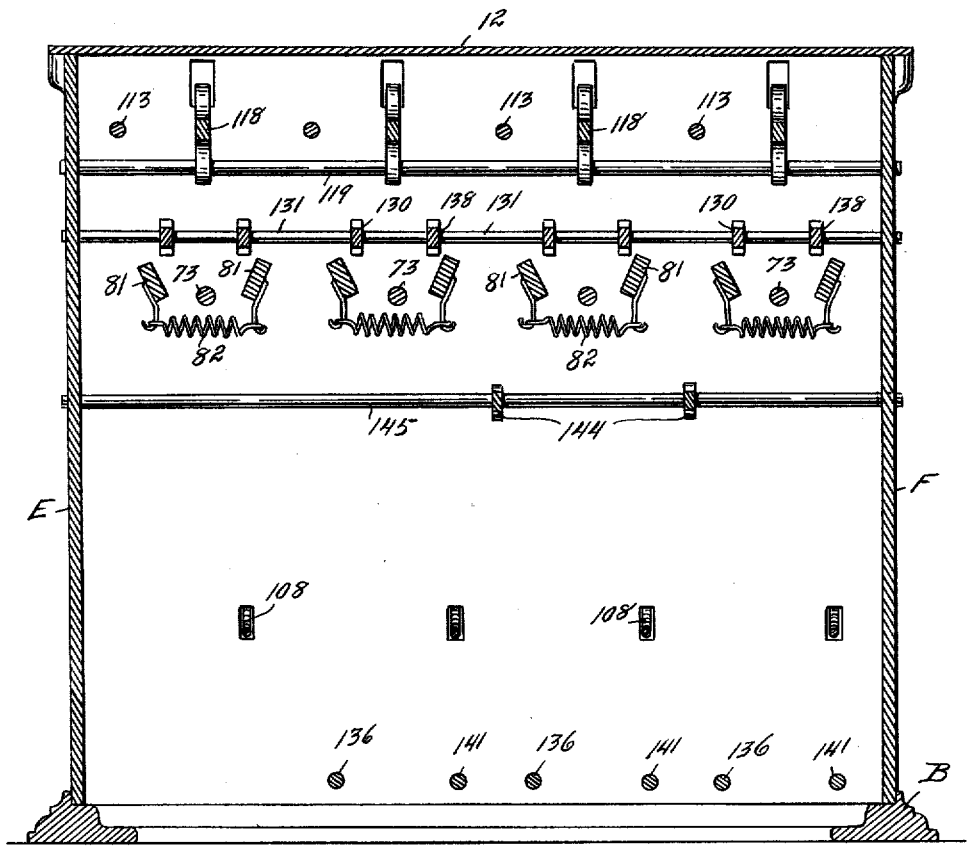
Fig. 14 is a section taken approximately on the line 14—14 Fig. 3 looking toward the left.

When any key is pressed during the performance of the adding function, its corresponding block 24 acts upon a pin of the corresponding carriage to depress the pin far enough to bring the stop 79 of that pin below a spring actuated retaining member 81 whereby the carriage pin is held in the depressed position (see Fig. 5) in which a number of the pins are illustrated as so held. There are two retaining members 81 for the pins of each carriage and the two members of each pair are connected at their extremities by a spiral spring 82 as best illustrated in Fig. 14. One of these retaining members engages the pins of the set 25 of each carriage, while the other engages the pins of the set 26, the two rows of pins being transversely spaced to properly correspond with the spacings of the two retainers 81 arranged adjacent the pins of each carriage.

Each carriage is actuated for performing the adding function, through the medium of two arms 83 and 84, each pair of arms being pivotally mounted adjacent each other upon a shaft 85. These arms are disposed to move in vertical planes and are actuated through the medium of two spindles 86 and 87 to which are respectively made fast crank arms 88 and 89 which arms are respectively pivotally connected as shown at 90 and 91 with the adjacent extremities of links 92 and 93 which are in turn respectively pivotally connected as shown at 94 and 95 with the arms 83 and 84. From this it will be understood that the crank arms 88 and 89 together with the links 92 and 93, form a sort of toggle connection between the spindles 86 and 87 and the arms 83 and 84. The object of this particular connection, is to enable the operator to perform several other functions simultaneously with or during the operation of the arms 83 and 84 for manipulating the carriages of the machine during the adding operation. The mechanism whereby these additional functions are performed will now be described: Secured to the spindle 86 is a projection 97 which as the spindle is actuated for the purpose of moving the corresponding carriage-actuating arm 83, engages a short dog 96 connected by a knife-blade joint with one extremity of a lever 98 whose opposite extremity is pivotally connected as shown at 200 with the lower end of a link 201 whose opposite end is pivotally connected as shown at 202 with one arm of a lever 203 whose opposite arm is pivoted as shown at 100 to the lower end of a rod 101 whose opposite or upper extremity is pivotally connected as shown at 102 with a crank arm 103 whose opposite end is made fast to a spindle 104. Also made fast to this spindle is an arm 105 whose opposite extremity engages a stop 106 made fast to the zero key of the corresponding bank of keys. It will be understood that there is one of these stops 106 for the zero key of each bank, whereby all of the zero keys are actuated every time the arms 83 and 84 are operated as hereinafter described. Hence there is a lever 98 for each bank of keys for each pair of arms 83 and 84 and all of these levers are connected and supported by a rod 99 which is rigidly secured to the series of levers.

The spindles 86 and 87 pass through the casing plate E of the machine and extend exteriorly therefrom, the exposed extremity of each spindle being equipped with a manipulating crank or arm 107. As the spindle 86 is turned or given the necessary partial rotation for actuating the arm 83, the projection 97 engages the dog 96 which moves idly during the movement of the arm 83 toward the left (see Figs. 3 and 4), but as soon as the spindle 86 is released, the arm 83 automatically returns to its normal position or that shown in Fig. 3 and during this movement, the projection 97 engages the dog 96 and actuates the lever 98, since the dog 96 has a knife-blade joint connection with its lever whereby it will move idly when force is applied in an upward direction, but will actuate the lever when force is applied in a downward direction as when the projection 97 returns to its normal position. The operation of the lever 98 due to the application of force in a downward direction to the dog extremity of the lever, will pull the rod 101 downwardly and actuate the arm 105 to cause it to depress the zero key of the corresponding bank and this operation takes place simultaneously with all of the zero keys of all the banks, the mechanism just described for operating a single zero key being repeated with reference to all of the other corresponding keys, the zero keys being devoid of buttons which are applied to the extremities of the other keys and upon which the numerals are formed as heretofore explained.

At the same time the arm 84 is actuated by the partial rotary movement of the spindle 87 which actuates a rod 108 which is connected at one extremity with the pivot pin 91, its opposite extremity being pivotally connected as shown at 109 with a lever 110 which is fulcrumed at 111. The upper or free extremity 112 of this lever, is arranged in close proximity to a rod 113 and acts upon a stop 114 with which that rod is equipped, to return the rod to its normal position after it has been actuated in a longitudinal direction by a spring 115 mounted thereon, one extremity of the spring engaging the wall D of the casing while its opposite extremity engages a stop 116 fast on the rod. This rod is normally held at its limit of movement toward the left, referring to Figs. 3, 4, 16 and 17, by the extremity 117 of a relatively long lever 118 which is fulcrumed at 119. The rod 113 is slidably mounted in the two walls C and D of the casing and its opposite extremities are respectively equipped with members 120 and 121 having top flat faces upon which are formed the characters 1, 2, 3, 4, 5, 6, 7, 8, 9 and 0 arranged from left to right in the order named. The object of the member 120 is to indicate through an opening 122, the particular key which is pressed during the operation of the machine in order that the operator by glancing at the opening 122 may know whether or not he has pushed the proper key. As the key is pressed, its block 27 acts upon the lever 118 and moves the latter sufficiently on its fulcrum 119 to disengage the extremity 117 from the stop 114 of the corresponding rod 113, and as soon as this occurs, the spring 115 which has been placed under tension by the movement of the rod 113 to its normal position, acts to move the said rod toward the right (see Figs. 3, 4, 16 and 17) far enough to bring the character of the part 120 of the rod into view in the corresponding opening 122 of the top plate of the machine. The movement of the rod 113 under the influence of its spring, is determined by the particular key which is pressed, the stop 116 of the rod 113 having a projection 123 which engages the block 27 of the particular key pressed. Hence the movement of the rod is stopped just in time to bring the number or numeral corresponding with that on the actuating key, into position to be seen through the said opening 122. At the same time the corresponding character on the member 121 of the rod 113, is brought into position to be printed on an apron or ribbon 124 which is carried by a roller 125 mounted in supports 126 extending upwardly from the top plate of the machine where it extends over the casing member 45. Each of the characters on the part 121 of the rod 113, is of such form that as the ribbon 124 which is inked is forced downwardly thereon by the corresponding movement of the lever 58, the numeral on the member 121 will be printed on the ribbon, the latter preferably consisting of a strip of paper of suitable width. Hence as one or more figures or characters corresponding with those on the members 120 and 121 of the rod 113, are put into the machine so to speak for adding purposes, they may be printed on the ribbon 124 by the downward movement of the lever 58. Then after these numerals which are arranged in transverse relation to the ribbon 124 have been added by the proper manipulation of the arms 83 and 84, the corresponding rods 113 will be returned to their normal positions by the parts 108 and 110 which are operatively connected with the arm 84 as heretofore described. It has already been explained that when the lever 58 is actuated for printing purposes, that its operation will impart partial rotation to the rod 42 and the rod 35 whereby all of the blocks 27 and their corresponding keys which have been depressed, will be released. Hence the keys are released and allowed to return to their normal position practically simultaneously with the return of the rods 113 to their position.

The upper extremities of the arms 83 and 84 are constructed with special reference to the function of these arms in the manipulation of the carriages carrying the sets of pins 25 and 26 as heretofore explained. Each arm has what may be termed an advance face 127 which extends forwardly from a rear face 128, the terms forward and rear being used with reference to the travel of the arms 83 and 84 during their initial manipulation for operating the carriages by virtue of their engagement with the depressed pins of the carriages. This distinction has no significance with the arms 83 and 84 of the carriage corresponding with the units bank of keys but is of importance with reference to the arms of the other banks. Again, the rear portions of the arms 83 and 84 are extended upwardly as shown at 129, in order that they may be long enough to engage the pins of the carriage corresponding with the keys 9, since the said carriage pins are shorter than the other pins as heretofore explained and when depressed are never in position to be engaged by the advance faces 127 of either of the arms 83 or 84. Whenever a pin except 9 of the set 26 of the units carriage for instance is down and in the path of the corresponding arm 83, one must be added to the next bank above, and in order to do this, the arms 83 and 84 of the tens carriage must be shifted on the shaft 85 from their normal position. The normal position of these arms is such that the advance face 127 of the arm 83 is in line with the pins of the set 26, while the rear face 128 of the arm 84 is in line with the pins of the set 25. In order to perform the carrying function as just explained, it is necessary that these keys be shifted on the rod 85 in order to bring the rear face 128 of the arm 83 into line with the pins of the set 26, while the advance face 127 of the arm 84 is brought into line with the pins of the set or row 25. The manner of accomplishing this function will now be explained: When any pin except 9 of the set 26 of the units carriage is depressed, its stop 78 engages a relatively long lever 130 which is fulcrumed on a rod 131, the extremity of said lever remote from its fulcrum being pivotally connected as shown at 132 with a depending rod 133 which is pivotally connected at its lower extremity as shown at 134 with a crank arm 135 which is fast on a shaft 136 journaled in the side plates C and D of the casing. Upon this shaft 136 is mounted a cam 137 which when the shaft is thus actuated is brought into engagement with the adjacent arm of the two arms 83 and 84, whereby both arms are shifted on the shaft 85 toward the left, referring to Fig. 5, whereby the rear face of the arm 83 of the tens carriage is brought into alinement with the pins of the set 26, while the advance face of the arm 84 is brought into alinement with the pins of the set 25 of the tens carriage. Again, as soon as a pin except 9 of the set 25 of the units carriage, for instance, is next depressed, its stop 78 will act upon a lever 138 which is pivotally connected at one extremity with a rod 139 which in turn is connected with a crank arm 140 fast on a shaft 141, whereby a partial rotary movement will be imparted to said shaft, said movement being sufficient to actuate a cam 142 on said shaft and cause it to engage the adjacent arm as 84 for instance, whereby the two arms 83 and 84 will be shifted on the shaft 85, toward the right, referring to Fig. 5, whereby the two arms 83 and 84 of the tens carriage, for instance, will be returned to their normal position. Again, when any pin except 9 of the set 26 of the tens carriage is depressed, its stop 78 will also act upon a lever 130 and through the medium of a rod 133 and a crank arm 135 actuate a cam 137 to shift the arms 83 and 84 corresponding with the hundreds carriage toward the left (see Fig. 5) sufficiently to bring the rear face 128 of the arm 83 into line with the pins of the set 26 of the hundreds carriage, and to bring the advanced face 127 of the arm 84 into line with the pin of the set 25; while when a pin 25 except 9 of the set 25 of the tens carriage is depressed, a lever 138 will be actuated through the medium of a rod 139 a crank arm 140 and a cam 141 to return the arms 83 and 84 corresponding with the hundreds carriage to their normal position. Furthermore, when a pin except 9 of the set 26 of any carriage is depressed, the arms 83 and 84 corresponding with the carriage of the next higher denomination, will be shifted toward the left. referring to Fig. 5 or in a direction to bring the rear face of the arm 83 into alinement with the pins of the set 26, and the advance face into alinement with the pins of the set 25; while when any pin except 9 of the set 25 of any carriage is depressed, the arms 83 and 84 corresponding with the carriage of the next higher denomination, will be moved to the reverse position or to their normal position.

Again, when a pin 9 of the tens carriage is depressed, it acts through the medium of the stop arm 78 on a relatively long lever 144 pivoted on a shaft 145 to depress a rod 146 which is pivotally connected as shown at 147 with a cam plate 148 which is actuated to shift the arms 83 and 84 corresponding with the hundreds carriage toward the left (see Fig. 5) or in a position to bring the rear face 128 into line with the pins of the set 26 and the advance face 127 into alinement with the pins 25 of the same carriage. In other words, the mechanism last explained serves to shift the arms 83 and 84 corresponding with the hundreds carriage, into the same position as these arms are shifted, when a pin except 9 of the set 26 of the tens carriage is depressed. Again, the same mechanism is actuated when a 9 pin of the hundreds carriage is depressed, to shift the arms 83 and 84 corresponding with the thousands carriage for the same purpose, and so on. As shown in the drawing, each cam plate 148 acts upon a pin 149 of the adjacent arm 84, as a fulcrum when it is shifted for actuating the arms 83 and 84 as heretofore explained. Furthermore, the cam plate is pivotally connected with the wall D of the casing as shown at 150. In view of the fact that the rod 146 is connected with the opposite end of the cam plate as shown at 151 (see Fig. 3), and the shaft 85 is just below the central portion of the cam plate 148, it is believed that the construction will be operative without fulcruming the cam plate at its end opposite the fulcrum 150 though provision may be made for fulcruming or pivoting both ends of the same if it shall be found necessary or desirable so to do, as by bell crank 206 which is pivoted in the wall of the casing as at 207. Since the pivot 150 is fixed against lateral movement the opposite end of member 148 will oscillate with the upstanding end of bell crank 206 under downward movement of rod 146 whenever arm 84 shifts, due to the fact that the plate 148 will always tend to fulcrum at its lower edge on arm 84 adjacent pin 149. Thus plate 148 will engage and shift the adjacent arm 83 only when the adjacent arm 84 has already been shifted. Thus a nine pin in one bank will carry 10 to the next bank only when 10 has just been carried from the preceding bank.

In view of the description of the mechanism together with the operation of the same heretofore given, I will now refer to the diagrammatic view (Fig. 15) in order to illustrate the use of the machine in the case of a simple concrete example:

In this view, three banks or columns of keys only are contemplated and the three carriages together with the arms 83 and 84 are also shown together with the corresponding sets 25 and 26 of pins for each carriage. In other words, the carriages are shown corresponding with the units, tens and hundreds banks of keys, and I will for convenience refer to these carriages as units, tens and hundreds carriages; the units bank being farthest toward the right. In the units carriage, the arms 83 and 84 are shown in their normal positions, while in the tens and hundreds carriages, the corresponding arms are shown in their shifted positions or into the positions to bring the rear face of the arm 83 into alinement with the pins of the set 26 and the advance face of the arm 84 into alinement with the pins of the set 25. It should be explained that the faces 127 and 128 of any arm 83 or 84 are so spaced that the distance between them measured in the direction of travel when shifting the carriages, is the distance between any two pins of either set, so that when the advance face of an arm engages a pin, it will move the carriage during the normal travel of the arm one space, or the distance between two pins, farther than when the rear face of the same arm engages the same pin. The limit of travel of the arms 83 and 84 is from the full line to the dotted line positions of each carriage in the diagrammatic view, thus showing that any rear face of an arm 84 will carry any pin that it may engage to a point on the broken line O in this view, while if the same pin were engaged by the advance face 127, it would carry the pin one space beyond the broken line O.

To illustrate the operation of these carriages, I will now take a simple, concrete example: For instance, I will explain the manner of adding the numbers 6, 66 and 60; first I will operate the key 6 of the units bank of keys which I will assume occupies the position directly over the pin indicated by the heavy dot adjacent the numeral 6 in the set 25 of pins of the units carriage, in which event, the pin 6 of the set 25 of the units carriage will be depressed, and when the arms 83 and 84 are actuated by grasping the exposed manipulating arms 107 of the two spindles 86 and 87, the pin 6 of the set 25 of the units carriage will be engaged by the rear face 128 of the corresponding arm 84 and the units carriage will be advanced until this pin 6 reaches the broken line O, and the number 6 of the member 76 on the rod 72 will be in position to be printed, and the number 6 of the member 75 of the rod 73 of the carriage will be visible through an orifice 152 of the top plate (see Fig. 1). I will now add the number 66 to the number 6: In operating the key 6 of the units bank the second time to add the unit 6 of the number 66, the units carriage now resting in the advance position indicated by the dotted lines in the diagrammatic view, the pin 2 of the set 26 will be under the key 6 which being depressed will be brought into the line of travel of the arm 83. As the arms 83 and 84 are operated the second time, the arm 83 will engage the pin 2 of the set 26 and return the carriage to such a position that the pin 2 of the set 25 of the units carriage will be brought to the broken line O. Now as the key 6 of the tens bank is depressed, the pin 6 of the tens carriage will also be depressed and when the fingers 83 and 84 are operated the third time, the arm 84 of the tens carriage will have its advance face 127 brought into engagement with the pin 6 of the set 25 and the said pin 6 will be carried one space beyond the broken line O, thus leaving the pin 7 in said line and the number 7 exposed through the proper orifice 152 of the top plate corresponding with the tens bank of keys, and as the number 2 is exposed through the orifice 152 corresponding with the units bank, the machine indicates the result 72, or the sum of 6 and 66. I will now add 60 and 72: As all pins on the broken line O being the zero pins of all the banks are automatically operated at each operation of the carrying arms 83 and 84 as heretofore explained, the zero key is not manipulated in adding this number and only the key 6 in the tens bank has to be operated; and as the carriage corresponding with the tens bank has been advanced to bring the pin 7 to the broken line O, the key 6 when operated will depress the pin 3 of the set 26 of the tens carriage, and as the operation of any pin of the set 26, results in the shifting of the arms 83 and 84 of the next bank above as heretofore explained, as the arms 83 and 84 are now operated, the pins of the units carriage will remain out of the line of travel of the operating arms, and the pin 3 of the set 25 of the tens carriage will be engaged by the advance face 127 of its operating arm 84, and the pin 3 of the set 25 will be brought to the broken line O, and the zero pin in the hundreds carriage being automatically depressed, will be engaged by the advance face 127 of the operating arm 84 of the hundreds carriage and advance the carriage one step bringing the pin number 1 into the broken line position, thus exposing the number 132 through the orifices 152 corresponding with the respective banks of keys, units, tens and hundreds, or 18, 19 and 20 as indicated in Fig. 1.

It has already been explained that when any pin of either set 25 or 26 of a carriage is depressed, it is retained in the depressed position by one of the spring actuated retaining members 81 adjacent the corresponding carriage. It is important to the operation of my improved structure that no two pins except 9 of the same carriage should be simultaneously held in the depressed position. Hence after one pin of any carriage has been depressed and retained in such position by the bringing of its stop 79 below the spring actuated retaining member 81, provision must be made for releasing this particular pin, as soon as any other pin of the same carriage is depressed. Hence provision is made for accomplishing this object and the mechanism utilized will now be explained: Just below the relatively long lever 118 which is acted on by the blocks 24 of the key stems as heretofore explained, is arranged a pair of arms 252 corresponding with each carriage of the structure, these arms 252 being pivotally mounted on the end wall C of the casing as best illustrated in Fig. 3. The inner or free extremities of these arms of each pair are normally in position to be acted on by the lever 118 as the latter is depressed by virtue of the engagement of any block of any bank of keys. The arms 252 are pivotally connected as shown at 153 with depending arms 154 which are slotted as shown at 155 to receive loosely fitting stationary guide pins 156 to cause the arms 154 to move approximately in a vertical position when the arms 252 are actuated. The lower extremities of the arms 154 respectively engage the spring actuated retaining plates 81 arranged below the corresponding bank of keys and arranged to cooperate with the pins of a certain carriage. The downward movement of the arms 154 incident to the actuation of the arms 252 by the lever 118 during each depression of a key and its block 24, is sufficient to throw the retaining plates 81 to the vertical position (see Fig. 7), whereby any pin of either set 25 or 26 of the corresponding carriage, will be released since the retaining plates when in the vertical position will no longer act on or engage the stops 79 of the carriage pins. By virtue of this construction and arrangement, the depressed pin of any carriage is released and the retaining plates allowed to return to their normal position before the next carriage pin is depressed. It will be understood that as soon as the lever 118 has passed below the inner extremities of the arms 252, the latter are free to return to their normal position, thus allowing the retaining plates 81 to assume the normal or inclined position, shown in Fig. 6 and also in Fig. 5.

I will now further explain the operation of the machine through the medium of another concrete example: I will now place in the machine the number 4321. This will be done by pressing the key 1 of the units bank; the key 2 of the tens bank; the key 3 of the hundreds bank, and the key 4 of the thousands bank. As soon as this is done, the number 4321 will appear through the perforations 122 of the top plate of the machine, this number taking the place of the normal zero characters which appear through these openings. The carriages are now actuated by operating the actuating arms 83 and 84 as heretofore explained. These arms will engage the corresponding depressed carriage keys and move the carriages to bring the number 4321 also into view through the perforations 152 of the top plate. It will be understood that the characters which appear through the perforations 122, are due to the movement of the indicating rods 113 which are released when any key is depressed, allowing the rods 113 to move forwardly until the projections 123 of the stops 116, engage the blocks 27 of the depressed keys. However, when the carriages are actuated to cause the number 4321 to appear through the transverse row of perforations 152, the rods 113 will be returned to their normal positions, thus returning the zero characters into view through the transverse row of perforations 122. As soon as the carriages are actuated as just explained, I will add the number 5678 to the number already in the machine, viz., 4321. In order to do this, I will depress the key 8 of the units bank, the key 7 of the tens bank, the key 6 of the hundreds bank, and the key 5 of the thousands bank. The carriages will then be again actuated, with the result that the number 9999 will take the place of 4321 as viewed through the row of perforations 152 of the top plate. During the last actuation of the carriages, the pin 9 of each carriage will be brought into line with the broken line O in Fig. 15. The depressed pin number 9 in the set of any carriage, does not operate the carrying device, therefore, the moving devices corresponding with each carriage or the arms 83 and 84 are in their normal position, the pin 9 of each carriage being carried forward by the arms 84 of the several carriages. I will now add 1 to the sum 9999. To accomplish this, I will depress the key marked 1 in the units bank. Now as soon as the arms 83 and 84 are actuated, the arm 83 will act on the pin number 1 of the units carriage and move the said carriage to bring the zero pin of the set number 25, into position on the broken line O (see Fig. 15). The carrying device of the units bank of keys consisting of the rods 130, 133, the link 135, the shaft 136 and the cam 137, will act upon the arms 83 and 84 corresponding with the tens carriage, to shift said arms toward the left, (see Fig. 5) whereby the rear face 128 of the arm 83 corresponding with the tens carriage is brought into line with the set of pins 26 of the tens carriage. The part of each arm 83 and 84 corresponding with the face 128, is considerably elevated as shown at 129 whereby it reaches upwardly far enough to engage the pin 9 of the set of pins with which it is in alinement. Hence when the arms 83 and 84 of the tens carriage are actuated, the advance face 127 of the arm 84, which is in line with the pins 25 of the tens carriage, will move without engaging the pin 9 of the set 25 since the part of each arm 83 and 84 corresponding with the advance face is sufficiently short to pass beneath the pins 9 which are shorter or which when depressed do not extend downwardly so far as the other pins as heretofore explained. Hence as the arm 83 of the tens carriage acts on the depressed pin 9, its action will move the carriage toward the left, (referring to Figs. 3 and 4) or rearwardly, to bring the zero pin of the set 25 of the tens carriage into position on the broken line O. Again, when the pin 9 of the tens carriage was depressed, its stop 78 acted on the auxiliary carrying mechanism composed of the rods 114, 146 and the plate 148 to shift the actuating arms 83 and 84 below the hundreds carriage, toward the left, (referring to Fig. 5) with the same result as heretofore explained, whereby the rear and tall face 128 of the actuating arm 83 of the hundreds carriage, was brought into the line with the set 26 of pins of the hundreds carriage, and consequently when the carriage was moved, this rear and tall face acting on the pin 9 which had been already depressed as heretofore explained, will shift this carriage rearwardly or toward the left, (referring to Figs. 3 and 4) a sufficient distance to bring the zero character of the set of pins 25 into position on the broken line O; and this result would also follow with reference to the thousands carriage so that there will be four zeros on the broken line O. Now it will be remembered that the tens of thousands carriage was not shifted, consequently the zero pin of its carriage would be down, since the zero pins are always thrown down after each operation of the arms 83 and 84 and as the latter return to their normal position by virtue of the mechanism heretofore explained. Hence the arms 83 and 84 of the tens of thousands carriage which have been shifted by the auxiliary carrying mechanism heretofore explained so as to bring the advance face 127 of the arm 84 into line with the set of pins 25 of the tens of thousands carriage, and this advance face when the arms 83 and 84 were actuated, acted upon the zero pin to move the latter one space or step forwardly, whereby the pin number 1 of the tens of thousands carriage was brought into position on the broken line O. It should be explained that in the diagrammatic view, the dotted line O is positioned to correspond with the positions of the pins of the various carriages, when the latter are actuated to produce an adding result corresponding with that shown by the numerals of the pins which are thus alined, and when the zero pins are thus alined in the four carriages corresponding with units, tens, hundreds and thousands banks of keys, and the numeral 1 of the tens of thousands carriage is also on this line, the number 10,000 will appear through the perforations 152 of the top plate. Furthermore, this same number will be in position to be printed by the operation of a lever 258 which is adjacent and similar in construction to the printing lever 58 for the primary numbers introduced into the machine as heretofore explained. This lever 258 is pivoted on the pin 59 and normally supported above the printing position by a spring 67 in the same manner as the lever 58. By the downward movement of the lever 258, the adding result obtained through the operation of my machine may be printed at any time through the medium of an inked pad 259 which acts upon the ribbon or sheet of paper 124 whereby the latter is forced downwardly into contact with the embossed faces of the result numerals or characters which are brought into line below the lever 258 and which are formed upon the parts 76 of the various carriages. It will be understood from what has been explained, that when the lever 58 is depressed for the purpose of printing the primary numbers as they are put into the machine, the arm 51 which is provided with a ratchet face 51$^a$ will slip past the teeth 51$^c$ of a ratchet wheel 51$^d$ mounted on the spindle of the roller 56, and as this lever returns to its normal position, the arm 51 will move upwardly and actuate the ratchet wheel 51$^d$, whereby the roller 56 is moved sufficiently to feed the paper strip or ribbon or move the same one step, whereby a fresh printing surface on the ribbon is brought into view below the lever 58 and also below the lever 258. It should be explained that this ribbon or paper strip 124 after leaving the roller 125 upon which it is normally wound, passes rearwardly around a roller 260 mounted on the supports 126, thence forwardly around a roller 261, and thence upwardly between the two rollers 55 and 56.

Attention is now called to the following details of construction together with their functions which have not heretofore been specifically pointed out: The indicating and printing members 77 and 76 of the carriage rods, and also the corresponding members 120 and 121 of the indicating rods 113, are supported by suitable rollers designated 300 and 301 respectively. These rollers are journaled in adjacent stationary parts and afford an anti-frictional support to the extremities of these rods, thus making it practicable to provide relatively small rods since by virtue of these supports, their extremities will have no tendency to sag or bend downwardly.

The mechanism for shifting the carriage operating arms 83 and 84 laterally upon the shaft 85 and which is operated by imparting partial rotation to the shaft 136, is automatically returned to its normal position by means of a torsionally acting spring 302 (see Figs. 3 and 4). Again, the mechanism for actuating the cam plates 148 is automatically returned to its normal position when released, by means of a torsional spring 303. The blocks 24 of the zero key of each bank 18, 19, 20, 21, etc., is centrally slotted as shown at 304, and the lever 118 is also provided with a registering slot or depression 305, so that the lever 118 will not be actuated by the downward movement of the zero keys which as heretofore explained are automatically depressed through mechanism operated by the return movement of the carriage actuating arm 83. The mechanism through the instrumentality of which the zero keys are all depressed as the arm 83 returns to its normal position after each carriage operating act, is acted on by a weak spring 306, this spring being employed simply for the purpose of normally exerting a slight downward pressure on the arm 105 when in either of its positions. This spring 306 is weaker than the spring 15 of the corresponding key stem, so that the recoil of the last named spring will return the arm 105 and its attachments to their normal position when the zero keys are released.

The lever 118 is returned to its normal position after each operation to release the indicating rod 113, by a spiral spring 307.

The carriage actuating arms 83 and 84 are together with their attachments returned to their normal position after each carriage actuating operation, by springs 308 which are connected with the operating arms 107 at one extremity and with the side wall E of the casing at their opposite extremities.

In order to prevent the shifting of the carriage actuating arms 83 and 84 laterally on the shaft 85, from interfering with the proper operation of the links 92 and 93 and their connections, the pivot pins 94 and 95 which are preferably rigidly mounted on the said arms, and are made of sufficient length and size with reference to the perforations in the adjacent ends of the links, to allow the pivot pins to move freely in the link extremities, and the arms 83 and 84 are cut away as shown at 309 to coöperate with said construction.

In order to lock the ratchet wheel 51$^d$ (see Fig. 13) against return movement after each operation due to the lifting of the ratchet bar 51, a gravity pawl 310 is employed, the same being pivotally mounted on the journal of the roller 55.

Each retaining pawl 28 for the key blocks 24 is returned to its normal position after each downward movement of a key block, by a suitable spring 312 (see Figs. 3 and 4).

Having thus described my invention, what I claim is:

1. An adding machine including a bank of keys, a horizontally movable carriage having devices arranged to be actuated by said keys, and means engaging an actuated device of the carriage for imparting the horizontal movement, the carriage being equipped with rods extending from the opposite ends thereof and respectively provided with indicating and printing characters.

2. A machine of the class described including keys, a horizontally movable carriage having devices arranged to be actuated by said keys, and means engaging an actuated device of the carriage for imparting the horizontal movement, the carriage being equipped with rods extending from the opposite ends thereof and respectively provided with indicating and printing characters and which are brought into view and into line for printing during the movement of the carriage.

3. An adding machine including keys, a horizontally reciprocable carriage having devices movably mounted and arranged to be actuated by the keys, and means arranged to engage the actuated devices of the carriage for shifting the carriage in reverse directions.

4. An adding machine including keys, a horizontally reciprocable carriage having devices movably mounted and arranged to be actuated by the keys, and means arranged to engage the actuated devices of the carriage for shifting the latter in reverse directions, the carriage being equipped with a part provided with indicating characters.

5. A machine of the class described including keys, a horizontally reciprocable carriage having devices movably mounted and arranged to be actuated by the keys, and means arranged to engage the actuated devices of the carriage for shifting the carriage in reverse directions, the carriage being equipped with parts respectively provided with indicating and printing characters.

6. A machine of the class described including keys, a horizontally reciprocable carriage having devices movably mounted and arranged to be actuated by the keys, and means arranged to engage the actuated devices of the carriage for shifting the latter in reverse directions, the carriage being equipped with rods extending from the opposite ends thereof and respectively provided with indicating and printing characters.

7. A machine of the class described including a horizontally movable carriage equipped with parts extending from its opposite extremities and respectively provided with indicating and printing characters, and means for actuating the carriage, the latter being provided with elements movable into the path of the actuating means, and positioned to determine the travel of the carriage for a given stroke of the actuating means.

8. A machine of the class described including a horizontally movable carriage, means for actuating the carriage to impart movement in reverse directions, and devices mounted on the carriage and movable into the path of the actuating means for varying the movement of the carriage for a given travel of said last named means.

9. A machine of the class described including a horizontally movable carriage, means for actuating the carriage to impart movement in reverse directions, and devices mounted on the carriage and movable into the path of the actuating means for varying the movement of the carriage for a given travel of said last named means, the carriage being provided with indicating characters.

10. A machine of the class described including a horizontally movable carriage, means for actuating the carriage to impart movement in reverse directions, and devices mounted on the carriage and movable into the path of the actuating means for varying the movement of the carriage for a given travel of said last named means, the carriage having a rod extending from one end thereof on which are formed indicating characters.

11. A machine of the class described including a horizontally movable carriage, means for actuating the carriage to impart movement, and devices mounted on the carriage and movable into the path of the actuating means, the carriage having a rod extending from one end thereof on which are formed printing characters.

12. A machine of the class described including a horizontally movable carriage, means for actuating the carriage to impart movement in reverse directions, and devices mounted on the carriage and movable into the path of the actuating means for varying the movement of the carriage for a given travel of said last named means, the carriage having rods extending from the opposite ends thereof on which are respectively formed indicating and printing characters.

13. A machine of the class described including a horizontally movable carriage, devices simultaneously movable in reverse directions for actuating the carriage, the latter carrying two sets of devices respectively movable into the paths of the actuating devices.

14. A machine of the class described including a horizontally movable carriage, devices simultaneously movable in reverse directions for actuating the carriage, the latter carrying two sets of devices which are respectively individually movable into the paths of the actuating devices, the carriage being equipped with indicating and printing devices corresponding in number and arrangement with one set of the said carriage devices.

15. A machine of the class described including a horizontally movable carriage, non-alined actuating devices simultaneously movable in reverse directions, and two sets of pins respectively movable into the paths of the said actuating devices and arranged to vary the travel of the carriage for a given movement of the actuating devices.

16. A machine of the class described, including a reciprocable carriage, means for actuating the carriage, a series of pins movably mounted on the carriage, springs acting on the pins to yieldingly retain them in the normal position, stops carried by the pins, a spring-held retaining member adapted to engage the stop of any pin when the latter is depressed, and means acting on the retaining member for moving the latter into position to release the stop of any pin, when another pin of the same carriage is depressed, said last named means comprising pivoted arms, a lever acting on said arms, and other arms pivotally connected with the first named arms and extending into engagement with the retaining member.

17. In a machine of the class described, a casing, a carriage, the latter having vertically spaced plates, two sets of pins, the pins of each set being longitudinally alined, the two sets being out of such alinement, means to engage a depressed pin of one set to move the carriage in one direction, and means to engage a depressed pin of the other set to move the carriage in the opposite direction.

18. A machine of the class described, including a casing and a carriage, the latter comprising vertically spaced plates, rods secured to the opposite ends of the carriage and freely movable in the opposite sides of the casing, two sets of pins, the pins of each set being longitudinally alined and the two sets being out of such alinement, all the pins being vertically movable in the carriage and spring-held in the normal position, means to engage a depressed pin of one set to move the carriage in one direction, and means to engage a depressed pin of the other set to move the carriage in the opposite direction.

19. A machine of the class described, including a casing, a carriage having supporting rods slidable in the casing, two non-alined sets of pins extending longitudinally of the carriage, said pins being normally spring-retained in a predetermined position, the two sets of pins being arranged in parallel lines suitably spaced transversely, means to engage a depressed pin of one set to move the carriage in one direction, and means to engage a depressed pin of the other set to move the carriage in the opposite direction.

20. A machine of the class described, including a casing, a carriage having end supporting rods slidable in the casing, and two longitudinal, transversely spaced rows of pins vertically movable and yieldingly retained in the normal position, and pin actuating keys respectively equipped with blocks at their lower extremities, the block of any pin being of sufficient width to engage any carriage pin of either row.

21. A machine of the class described, including a casing, a carriage having end supporting rods slidable in the casing, and two longitudinal, transversely spaced rows of pins vertically movable and yieldingly retained in the normal position, and pin-actuating keys respectively equipped with blocks at their lower extremities, the block of any pin being of sufficient width to engage any carriage pin of either row, the pins of the two rows being out of transverse alinement except two of the end pins.

22. A machine of the class described, including a casing, a carriage having end supporting rods slidable in the casing, and two longitudinal, transversely spaced rows of pins vertically movable and yieldingly retained in the normal position, and pin-actuating keys respectively equipped with blocks at their lower extremities, the block of any key being of sufficient width to engage any carriage pin of either row, the two rows of pins extending in opposite directions from two transversely alined end pins.

23. A machine of the class described, including a casing, a carriage having end supporting rods slidable in the casing, and two longitudinal, transversely spaced rows of pins vertically movable and yieldingly retained in the normal position, and pin actuating keys respectively equipped with blocks at their lower extremities, the block of any pin being of sufficient width to engage any carriage pin of either row, the two rows of pins extending in opposite directions from two transversely alined end pins, the said key blocks having projections, and a spring-held plate engaging the said projections of the blocks for retaining any key in the depressed position, the plate being arranged to release any key when another key is actuated, the keys being normally retained in a predetermined position.

24. A machine of the class described, including a number of horizontally movable carriages, each equipped with parts extending from its opposite extremities and respectively provided with indicating and printing characters, a distinct device for actuating each carriage, each carriage being provided with elements movable into the path of the carriage actuating device and positioned to determine the travel of the carriage for a given travel of the actuating means, and means for simultaneously operating the actuating devices of all the carriages.

25. A machine of the class described, including a number of horizontally reciprocable carriages, distinct means for intermittently imparting to each carriage the strokes of the reciprocation, each carriage being equipped with devices movable into the path of the carriage actuating means and positioned to determine the travel of the carriage for a given travel of the actuating means, and means for simultaneously operating the carriage actuating means of all the carriages.

26. A machine of the class described, including a number of longitudinally movable carriages, distinct means for actuating each carriage to impart movement thereto in reverse directions, devices mounted on each carriage and movable into the path of the corresponding actuating means, said devices of each carriage being positioned to vary the travel of the carriage for a given travel of the actuating means, and means for simultaneously operating the actuating means of all the carriages.

27. A machine of the class described, including a number of horizontally movable carriages, distinct means for imparting movement to each carriage in reverse directions, devices movably mounted on each carriage and movable into the path of the actuating means, the said devices of each carriage being positioned to vary the travel of the carriage for a given travel of its actuating means, and means for simultaneously operating the carriage actuating means of all the carriages, each carriage having parts movable therewith and upon which are formed indicating characters.

28. A machine of the class described, including a number of horizontally movable carriages, distinct means for imparting movement to each carriage in reverse directions, devices movably mounted on each carriage and movable into the path of the actuating means, the said devices of each carriage being positioned to vary the travel of the carriage for a given travel of its actuating means, and means for simultaneously operating the carriage actuating means of all the carriages, each carriage having parts movable therewith upon which are respectively formed indicating and printing characters.

29. A machine of the class described, including a number of horizontally movable carriages, distinct means for imparting movement to each carriage in reverse directions, devices movably mounted on each carriage and movable into the path of the actuating means, the said devices of each carriage being positioned to vary the travel of the carriage for a given travel of its actuating means, and means for simultaneously operating the carriage actuating means of all the carriages, each carriage being equipped with supporting rods movable therewith and respectively provided with indicating and printing characters.

30. A machine of the class described, including a number of horizontally movable carriages, each carriage being equipped with devices movable into the path of the carriage actuating means, said last named means comprising devices simultaneously movable in reverse directions for actuating each carriage.

31. A machine of the class described, including a number of horizontally movable carriages, devices simultaneously movable in reverse directions for actuating each carriage, each carriage having two sets of devices, the devices of each set being individually movable into the paths of the actuating devices, and means for simultaneously operating the actuating devices of all the carriages.

32. A machine of the class described, including a number of horizontally movable carriages, means for actuating each carriage, the latter being equipped with devices movable into the path of the carriage, actuating means for simultaneously operating the actuating means of all the carriages, a distinct bank of keys for each carriage, said keys being arranged to impart the necessary movement to the movable devices of the carriages to bring the latter into the path of the carriage actuating means.

33. An adding machine, including a carriage provided with two rows of pins transversely spaced, carriage actuating means consisting of two devices movably mounted and respectively in alinement with the two rows of pins, the pins being normally spring-supported out of the path of the carriage actuating devices, but movable into the path thereof, and means for simultaneously operating the carriage actuating devices to cause them to move in opposite directions.

34. An adding machine, including a carriage equipped with two transversely spaced rows of pins, carriage actuating means including two devices mounted to move in alinement respectively with the two rows of pins, the latter being normally spring-supported out of the path of the carriage actuating devices, but movable into such path, means for laterally shifting the carriage actuating devices, and means for operating said devices to cause them to move a predetermined distance in reverse directions.

35. A machine of the class described, including a carriage equipped with two transversely spaced rows of pins, carriage actuating means, including two devices mounted to move in alinement respectively with the two rows of pins, the carriage actuating devices being each provided with laterally offset advance and rear faces, one face of each device being normally in alinement with its corresponding row of pins, and means for laterally shifting the said devices to bring the other face of each device into such alinement.

36. A machine of the class described, including a carriage equipped with two transversely spaced rows of pins, carriage actuating means, including two devices mounted to move in alinement respectively with the two rows of pins, the carriage actuating devices being each provided with laterally offset advance and rear faces, one face of each device being normally in alinement with its corresponding row of pins, and means for laterally shifting the said devices to bring the other face of each device into such alinement, one of the said faces of each carriage actuating device also projecting farther toward the pins than the other face.

37. A machine of the class described, including a carriage equipped with two transversely spaced rows of pins, carriage actuating means, including two devices mounted to move in alinement respectively with the two rows of pins, the carriage actuating devices being each provided with laterally offset advance and rear faces, one face of each device being normally in alinement with its corresponding row of pins, and means for laterally shifting the said devices to bring the other face of each device into such alinement, means for projecting the pins toward the carriage actuating devices, certain of the pins when thus actuated being slightly farther away from the carriage actuating devices than the other pins, but positioned to be engaged by the projecting faces of the carriage actuating devices.

38. A machine of the class described, including a carriage movably mounted, and equipped with two rows of devices transversely spaced, carriage actuating means consisting of two members respectively movable into engagement with the devices of the said rows when said devices are projected, the latter being normally spring-supported out of the path of the two members of the carriage actuating means.

39. A machine of the class described, including a carriage movably mounted, and equipped with two rows of devices transversely spaced, carriage actuating means consisting of two members respectively movable into engagement with the devices of the said rows when said devices are projected, the latter being normally spring-supported out of the path of the two members of the carriage actuating means, and means for moving said members simultaneously in reverse directions.

40. A machine of the class described, including a carriage movably mounted, and equipped with two rows of devices transversely spaced, carriage actuating means consisting of two members each equipped with laterally offset advance and rear faces, one of said faces being normally in position to engage the devices of its corresponding row when the latter are projected, the devices being normally spring-retained out of the path of the said members.

41. A machine of the class described, including a carriage movably mounted and equipped with two rows of devices transversely spaced, carriage actuating means consisting of two members, each equipped with laterally offset advance and rear faces, the carriage actuating means being laterally shiftable to bring the two faces of each member alternately into position to engage the said devices of its corresponding row when the latter are projected, the said devices being normally spring-supported out of the path of the carriage actuating means, and means for projecting the said devices.

42. A machine of the class described, including a horizontally movable carriage equipped with two rows of devices transversely spaced, carriage actuating means composed of two members each equipped with laterally offset front and rear faces, one of which is normally in position to engage a device of its corresponding row, when said device is projected, the said device being normally spring-supported out of the path of the carriage actuating members, and means for laterally shifting the said members to bring the two faces of each alternately into position to engage the projected devices of the corresponding rows.

43. A machine of the class described, including a horizontally movable carriage equipped with two rows of devices transversely spaced, carriage actuating means composed of two members, each equipped with laterally offset front and rear faces, one of which is normally in position to engage a device of its corresponding row, when said device is projected, the said device being normally spring-supported out of the path of the carriage actuating members, and means for laterally shifting the said members to bring the two faces of each alternately into position to engage the projected devices of the corresponding rows, the rear face of each member extending farther toward its row of carriage devices than the other face.

44. An adding machine, including a number of transversely movable carriages respectively designated 1st, 2d, 3d, 4th, etc., each equipped with two transversely spaced rows of devices, two actuating members for each carriage, said members being respectively arranged to act on the devices of said rows when said devices are projected, the said actuating members of each carriage except the first, each having laterally offset advance and rear faces, one of which is in position to engage the devices of its corresponding row when projected, the two actuating members of each carriage after the first, being laterally shiftable to cause their said faces to be brought alternately into position to engage the projected devices of the corresponding row, and means for projecting said devices which are normally spring-supported out of the path of the carriage actuating members.

45. An adding machine, including a number of transversely movable carriages respectively designated 1st, 2d, 3d, 4th, etc., each equipped with two transversely spaced rows of devices, two actuating members for each carriage, said members being respectively arranged to act on the devices of the said rows when said devices are projected, the said actuating members of each carriage except the first, each having laterally offset advance and rear faces, one of which is in position to engage the devices of its corresponding row when projected, the two actuating members of each carriage after the first, being laterally shiftable to cause their said faces to be brought alternately into position to engage the projected devices of the corresponding row, and means for projecting said devices which are normally spring-supported out of the path of the carriage actuating members, means for shifting said carriage actuating members, said means for any carriage being actuated by the projection of the carriage devices of the carriage in advance, according to the aforesaid designation.

46. A machine of the class described, including a horizontally movable carriage equipped with two rows of devices transversely spaced, carriage actuating means composed of two members, each equipped with laterally offset front and rear faces, one of which is normally in position to engage a device of its corresponding row when projected, the said carriage actuating members being laterally shiftable in opposite directions to bring their front and rear faces respectively into alinement with the corresponding rows of projected carriage devices.

47. An adding machine, including a number of horizontally movable carriages respectively designated 1st, 2d, 3d, 4th, etc., each equipped with two transversely spaced rows of devices, two actuating members for each carriage, said members being respectively arranged to act on the devices of the said rows when said devices are projected, the said actuating members of each carriage except the first, having laterally offset advance and rear faces, one of which is in position to engage the devices of its corresponding row when projected, the actuating members of each carriage after the first being laterally shiftable in opposite directions to bring its said faces alternately into alinement with its corresponding row of carriage devices.

48. An adding machine including a horizontally movable carriage equipped with two rows of devices transversely spaced, carriage actuating means composed of two members respectively in alinement with the two rows of carriage devices which are normally spring-supported out of the path of the carriage actuating members, the latter being reciprocably mounted, means for imparting the reciprocating movement to each of said members, movable keys for projecting the carriage devices into the path of the carriage actuating members, and an operative connection between one of the carriage actuating members, and a certain key for actuating the latter as the said actuating member returns to its normal position after its carriage actuating stroke.

49. An adding machine, including a horizontally movable carriage equipped with two rows of devices transversely spaced, carriage actuating means composed of two members respectively in alinement with the two rows of carriage devices which are normally spring-supported out of the path of the carriage actuating members, the latter being reciprocably mounted, means for imparting the reciprocating movement to each of said members, a spring-actuated rod carrying primary indicating and printing characters at its opposite ends, said rod being reciprocably mounted, a spring for moving the said rod in one direction, and an operative connection between said rod and one of the carriage actuating members for returning said rod to its normal position when the said member is actuated.

50. An adding machine, including a bank of keys, a rod reciprocably mounted and under tension to move in one direction, a lever for normally locking the said rod against the tension of its spring, the said lever lying in the path of the said keys when projected, whereby every time a key is actuated, the said rod is released, each key being equipped with a block which limits the movement of the said rod under the tension of its spring, and means for returning the rod to its normal position before the next key is actuated, the rod being equipped at its opposite extremities with indicating and printing characters.

51. An adding machine, including a carriage reciprocably mounted and equipped at its opposite ends with rods upon which are respectively formed indicating and printing characters, means for actuating the carriage to bring its printing and indicating characters into predetermined positions, the machine having a top plate provided with perforations through which the indicating characters are visible, and means coöperating with the printing characters for printing purposes, said means including a fabric upon which the said characters are printed, and a rod reciprocably mounted in the machine and also equipped at its opposite ends with indicating and printing characters, the top of the machine having perforations through which the indicating characters are visible, and means at the opposite extremity of the machine for reproducing the printing characters, the indicating and printing characters of the rod and carriage being respectively out of transverse alinement.

In testimony whereof I affix my signature, in presence of two witnesses.

WALTER A. HOMAN.

Witnesses:
MARY HIGGINS,
A. EBERT O'BRIEN.